Nov. 7, 1967
P. VETTERLI
3,351,328
APPLIANCE FOR THE ENRICHMENT OF WATER WITH
OXYGEN, PARTICULARLY IN FISH BREEDING
Filed June 26, 1964
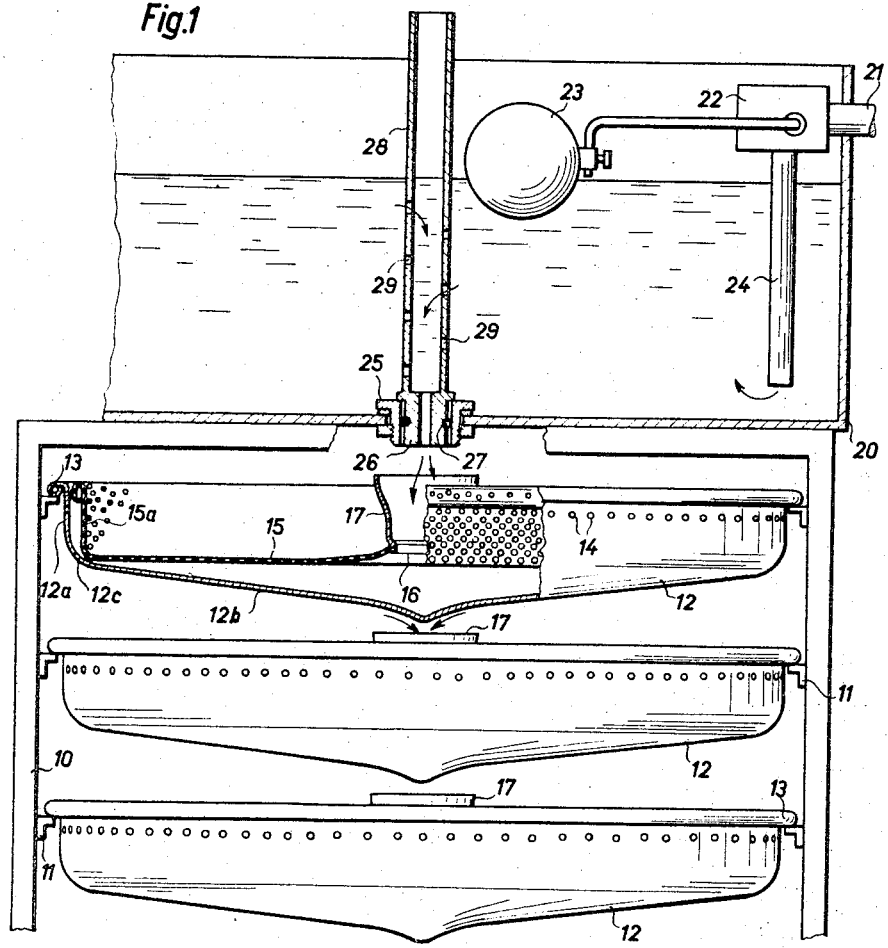
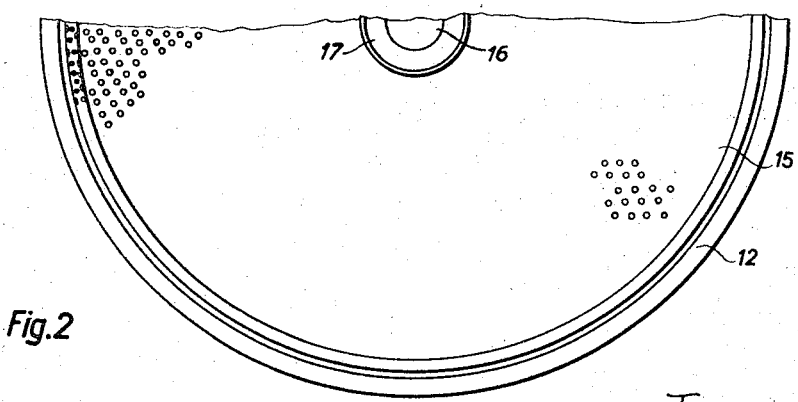
Inventor
Peter Vetterli
By
Watson, Cole, Grindle + Watson
Attys.

United States Patent Office 3,351,328
Patented Nov. 7, 1967

3,351,328
APPLIANCE FOR THE ENRICHMENT OF WATER WITH OXYGEN, PARTICULARLY IN FISH BREEDING
Peter Vetterli, Zurich, Switzerland, assignor to Robert Mayr, Winterthur, Switzerland
Filed June 26, 1964, Ser. No. 378,222
Claims priority, application Austria, July 2, 1963, A 5,234/63
5 Claims. (Cl. 261—112)

ABSTRACT OF THE DISCLOSURE

A fish hatchery and rearing appliance having means to apply water and aerated to enrich the water with oxygen. The appliance has a series of spaced containers arranged one above the other and each formed with a central conical projection and each container having a perforated sieve pan. Means are provided to supply water to the series of containers with water overflow from one pan into the other with entry of the water into the center of each container.

---

The subject of the present invention is an appliance for the enrichment of water with oxygen, particularly for fish breeding where water rich in oxygen must be used both for rearing the fry and for hatching the eggs.

It is already known in order to aerate the water used for fish breeding, and to enrich same with oxygen, to bring air into contact therewith over relatively large surfaces and in thin layers, by allowing the water to flow on the underside of inclined guide surfaces. For this purpose it is known to arrange a number of panlike containers one above the other in stepped formation and between these to provide inclined guide surfaces for the flow thereover of the water into the next lower container. The containers in the known construction are of rectangular form in plan and the inclined surfaces thus lead from the front edge of one to the rear edge of the next lower container.

It has now been found that the action and the working capacity of an appliance for enriching water with oxygen with relatively similar space utilisation can be mounted in such a way that containers are constructed so as to be symmetrical rotation-wise with respect to a vertical axis and are arranged above one another in axial alignment, the bottom of each container being depressed conically towards the center and forming with its lower surface directly the inclined guide surface for the water flowing over on the whole circumference of the container.

A sieve pan or shell can be loosely set into each container, having at its centre an inlet orifice with an upwardly projecting, funnel-shaped neckpiece to catch the water flowing from the underside of the container lying above it. The sieve can advantageously serve directly to receive the fish eggs or fry.

Further details of the invention are set forth in the claims, the following description and the accompanying drawing, in which a constructional embodiment of the subject of the invention is illustrated purely by way of example.

FIG. 1 is a part sectional and elevational view showing an appliance for enriching water with oxygen suitable for fish breeding;

FIG. 2 is a plan view of a part of a single container with sieve shell set therein.

The appliance shown in FIG. 1 comprises a box-like frame 10 with horizontally disposed supporting bars 11. Each two bars arranged at the same level carry a pan-shaped container 12 which is made symmetrical rotation-wise with reference to a vertical axis. Each container 12 comprises a cylindrical circumferential wall 12a and a bottom 12b which is conically depressed towards the centre. The inclination of the bottom 12b relative to the horizontal plane is less than 10° and increases continuously towards the centre. Between the circumferential wall 12a and the floor 12b is provided a continuous passage which is formed by the part 12c which at least in vertical section is approximately arcuate in form. The abovementioned expression "continuously" means without steps or sudden change of direction.

The circumferential wall 12a has at the top an outwardly projecting rim 13 by the aid of which the container concerned is freely supported on the bars 11. At a suitable distance below the rim 13 the wall 12a is provided with a horizontally arranged series of outflow apertures 14 for the water overflowing. In case of need two or more series of apertures may be provided, it being unnecessary for the number of apertures in each row to be the same.

The containers 12 advantageously consist of aluminium, and their outside is roughly ground, pickled and oxidised black without subsequent treatment with petrol or oil, so that the surface is not water-repellant. The oxidising in a black colour has the advantage over oxidising in other colours in that the metal surface has large pores and presents increased wetability.

A circular sieve shell 15 is loosely inserted in each container 12, and has at its centre an outlet orifice 16 with an upwardly projecting, funnel-shaped neck piece 17 through which water is to be introduced into the container. The bottom of the sieve shell 15 rises conically in the region of the inlet orifice 16, and towards the neckpiece 17, but is otherwise plane. The sieve shell 15 furthermore presents a cylindrical circumferential wall 15a, between which and the circumferential wall 12a of the container 12 concerned is provided a free annular space. The corner between the wall 15a and the bottom of the sieve shell 15 sits on the part 12c where it is arcuately curved as viewed in vertical section.

The sieve shell 15 consists of perforated aluminium sheet which is pickled and oxidised. The holes of the sieve have, for example a diameter of 1.5 mm. and there are 15 to 20 holes per square cm. The sieve holes are disposed not only in the bottom, but also in the circumferential wall 15a. The neckpiece preferably has no side apertures.

In the frame 10 there are arranged, for example, ten containers 12 axially one above the other, so that the conical projecting point of the bottom 12b is disposed at a suitable distance above the neckpiece 17 of the next lower container 12.

A supply reservoir 20 into which enters a supply pipe 21 is arranged above the frame 10 for supplying water to the uppermost container 12. The quantity which flows in is regulated by a valve 22 which is controlled by a float 23. A tube 24 conducts the water from the valve 22 into proximity to the bottom of the reservoir 20. Axially above the uppermost container 12 there is an outlet in the bottom of the supply reservoir 20 in which a bush 25 is tightly plugged. In the bush 25 sits an exchangeable outflow nozzle 26 which is sealed against the bush 25 by a packing ring 27. The nozzle 26 is secured at the lower end of a vertically arranged pipe 28, which has a number of lateral apertures 29 for admitting the water.

The supply reservoir 20 can be common to a plurality of frames 10 with containers 12 arranged therein one above the other, in which case an outflow nozzle 26 of the kind described is arranged in the bottom of the reservoir 20 above each frame.

The manner of use and operation of the appliance described is as follows:

With the aid of the float 23 and valve 22 the water level in the supply reservoir 20 is maintained constantly at the same level. The water enters the pipe 28 through the apertures 29, any foreign matter floating or suspended in the water being, however, held back. The water in the tube 28 has the same level as that in the supply reservoir. The water flows through the outlet nozzle 26 at a constant rate, for example 2 litres per minute, through the neckpiece 17 of the sieve shell 15 in the uppermost container 12 and through this into the latter. From the bottom of this the water passes through the sieve holes in the bottom of the sieve shell 15 so that the container 12 and the sieve shell 15 set therein are filled with water. Through the sieve perforations in the circumferential wall 15a of the sieve shell the water passes into the annular space between the walls 12a and 15a, in order to flow from there out through the apertures 14. The water level in the container 12 and sieve shell 15 stands slightly above the apertures 14. The water passing out of the container 12 through the apertures 14 flows on the outside of the circumferential wall 12c and on the underside of the container 12b, and downwards to the conical point of the bottom, from which the water runs off into the funnel shaped neckpiece 17 in container 12 lying next below.

The water passes through all the containers arranged one above the other in the manner described. On the outside of the circumferential wall 12a and on the underside of the bottom 12b of the containers the water is for the time being dispersed in a thin uninterrupted film, the relatively large surface of which is in contact with air and takes up air, whereby the water is enriched with oxygen.

In the sieve shells 15 may be placed fish eggs to be hatched or young fish which on account of the repeated oxygenation of the water find practically similar favourable living conditions in all the containers 12. The flow of water within each of the sieve shells 15 is very small and uniform so that no disturbance of the eggs or fish occurs. It is to be observed that the sieve shells raise a substantial resistance that the sieve shells raise a substantial resistance to the flow of water, which, together with the fact that from the inlet aperture 16 a space which narrows radially outwards extends between the container bottom 12b and the bottom of the sieve shell 15, ensures that the flow is approximately uniformly distributed to all the sieve apertures in the bottom of the sieve shell. It is thereby avoided in an advantageous manner that the eggs or fish near the circumferential wall 15a are subjected to a stronger flow of water than the others.

Air bubbles which may be entrained by the water flowing through the containers 12, cannot pass through the sieve apertures of the sieve shells 15. In order to allow such air bubbles a way of escape if they occur on the bottom of the sieve shells 15, the bottom of the sieve shell is inclined slightly upwards conically in the vicinity of the neckpiece 17. The air bubbles can escape radially inwards over the conical portion of the bottom towards the neckpiece 17.

The bottom of each container 12 has somewhat increased inclination to the horizontal towards the point of the cone in order to facilitate the dripping of the water from said point.

The appliance described need not necessarily be used with the sieve shells 15 inserted therein. If desired water passing through the containers 12 can be simply enriched with air and oxygen in order to be used otherwise for fish breeding or other purposes.

The chief advantage of the appliance lies in the fact that a relatively strong enrichment of the water with oxygen is assured and therefore a relatively small quantity of water is necessary for breeding a given number of fish. It is therefore possible to prepare the water in an economic manner, to cool it or heat it. The appliance has the further advantage that it takes up relatively little space. In comparison with conventional fish rearing appliances only about one tenth of the space and quantity of water is required. The containers 12 with the sieve shells 15 inserted therein can be easily removed individually from the frame 10 for inspection and replaced therein. If desired the frame 10 can be of box form enclosed with walls and doors, so that the fish eggs and fry may not be disturbed by the influence of light.

What I claim is:

1. Fish hatchery and rearing appliance having means for the enrichment of water with oxygen comprising a frame, a plurality of bowl-shaped containers each with a bottom and spaced one above the other in the frame and having inclined bottom surfaces between the containers and a circumferential side wall terminating in a rim and along the sides of which overflow water flows into the next lower container, the containers being formed so as to be symmetrical rotation-wise with reference to a vertical axis and are disposed co-axially one above the other, the bottom of each container having a conical projection in the aproximate center and its underside forming directly an inclined conducting surface for the water flowing over and around the entire circumference of each container and then along the bottom of the container to the center, and means on the frame and over the topmost container to feed water thereto and a flow path for the water extending from the means to the center of the topmost container over the circumferential rim into the next lower container.

2. Fish hatchery and rearing appliance according to claim 1, in which the circumferential wall of each container is provided with at least one horizontally arranged series of apertures for the overflow of the water.

3. Fish hatchery and rearing appliance according to claim 1, in which an outwardly projecting rim is provided secured in the frame for each container to support the container in the frame in the spaced relationship.

4. Fish hatchery and rearing appliance according to claim 1, in which a sieve pan is provided for each container loosely inserted therein, said sieve pan having at its center an inlet orifice with an upwardly projecting funnel-shaped neckpiece for the entry of the water and extending above the rim of the container.

5. Fish hatchery and rearing appliance according to claim 1, in which a sieve pan is provided for each container loosely inserted therein, said sieve pan having at its center an inlet orifice with an upwardly projecting funnel-shaped neckpiece for the entry of the water and extending above the rim of the container, and in which each sieve pan has a cylindrical circumferential wall, between which and the circumferential wall of its container provides a free space.

References Cited

UNITED STATES PATENTS

| 448,568 | 3/1891 | Wood | 261—113 |
|---|---|---|---|
| 474,630 | 5/1892 | Deckebach | 261—113 |
| 697,160 | 4/1902 | Ostendorff | 261—113 |
| 1,108,853 | 8/1914 | Sewell. | |
| 3,085,793 | 4/1963 | Pike et al. | 261—112 |

FOREIGN PATENTS

| 206,804 | 4/1924 | Great Britain. |
|---|---|---|

HARRY B. THORNTON, *Primary Examiner.*

E. H. RENNER, *Assistant Examiner.*